United States Patent [19]

Rowlett

[11] Patent Number: 5,325,799
[45] Date of Patent: Jul. 5, 1994

[54] SEED BOOT INSERT

[75] Inventor: Don C. Rowlett, Bedford, Pa.

[73] Assignee: Kennametal Inc., Latrobe, Pa.

[21] Appl. No.: 951,631

[22] Filed: Sep. 25, 1992

[51] Int. Cl.5 .......................... A01C 5/00; A01B 15/00
[52] U.S. Cl. ................................. 111/152; 111/154; 172/719; 172/772
[58] Field of Search .................... 111/81, 170, 34, 51, 111/124, 900, 154, 152, 150; 172/719, 772, 772.5

[56] References Cited

U.S. PATENT DOCUMENTS

| | | | |
|---|---|---|---|
| 107,554 | 9/1870 | Slaughter | 111/152 |
| 3,658,018 | 4/1972 | Connor | 111/88 |
| 3,882,594 | 5/1975 | Jackson et al. | 172/719 |
| 4,231,306 | 11/1980 | Whitehead et al. | 111/150 |
| 4,356,780 | 11/1982 | Bauman | 111/85 |
| 4,373,456 | 2/1983 | Westerfield | 111/88 |
| 4,398,478 | 8/1983 | Frase et al. | 111/85 |
| 4,408,667 | 10/1983 | Jarvis | 172/719 |
| 4,423,788 | 1/1984 | Robinson, Jr. et al. | 172/427 |
| 4,493,274 | 1/1985 | Robinson, Jr. et al. | 111/88 |
| 4,736,803 | 4/1988 | Roush | 172/560 |
| 4,766,962 | 8/1988 | Frase | 172/624.5 |
| 4,941,711 | 7/1990 | Stiffler | 299/79 |
| 4,955,297 | 9/1990 | Tsukamoto | 172/719 |
| 5,129,168 | 7/1992 | Hedley | 172/719 |
| 5,159,985 | 11/1992 | Rowlett | 172/723 |
| 5,224,555 | 7/1993 | Bain et al. | 172/719 |

FOREIGN PATENT DOCUMENTS

| | | | |
|---|---|---|---|
| 3535211 | 4/1987 | Fed. Rep. of Germany | 111/152 |
| 8204375 | 12/1982 | World Int. Prop. O. | 172/719 |

Primary Examiner—Clifford D. Crowder
Assistant Examiner—Michael A. Neas
Attorney, Agent, or Firm—John J. Prizzi; Larry R. Meenan

[57] ABSTRACT

A seed boot for depositing a seed within a furrow including spaced side members, a face plate extending between forward edges of the side members, and a rear spacer member extending between rearward edges of the side members, and a wear insert secured to each of the side members of the seed boot. The insert includes an elongated rectangular bar having a top and bottom surface, a leading and trailing face and longitudinal side faces extending between and around the peripheral edges of the top and bottom surfaces.

2 Claims, 4 Drawing Sheets

SEED BOOT INSERT

BACKGROUND OF THE INVENTION

1. Field of the Invention

This invention related to a new type of insert. More particularly, this invention relates to a new type of insert that may be used in connection with a seed boot for depositing a seed within a furrow.

2. Description of the Related Art

The proper depositing of seeds into a v-shaped furrow formed in the soil requires special care in handling the seeds and in maintaining the side walls of the furrow to ensure that the seed is deposited within the v-shaped furrow at the proper seed planting depth. It will be appreciated that if a seed boot is in a worn condition, loose soil from the sidewalls of the v-shaped furrow may spill into the furrow before the seed is deposited or the seed may be blown or bounced around or out of the furrow, such that the seed is prevented from being deposited in the furrow or from reaching a proper seed planting depth. To achieve proper seed planting depth and prevent soil from collapsing in the furrow prior to depositing the seed a worn seed boot must be either continually adjusted for proper height with the bottom of the furrow or the seed boot must be replaced. Replacement of a worn seed boot results in lost planting time and reduced cost-effectiveness.

The present invention is concerned with a unique insert geometry which may be simply and effectively secured to a seed boot to protect the seed boot from wear. The present invention is also concerned with providing a wear resistant seed boot which will contribute to proper depositing of seeds to achieve a proper seed planting depth.

Accordingly, one aspect of the present invention is to provide an improved insert geometry which can be molded to form a finished product and effectively bonded to a seed boot for use in an abrasive rocky soil.

Another aspect of the present invention is to provide a uniquely shaped insert that is economical to manufacture and may be effectively bonded to a seed boot to provide an increased wear life for the seed boot. Still another aspect of the present invention is to secure at least one wear insert to at least one, and preferably each side of a seed boot to prevent wear of the seed boot.

Yet another aspect of the present invention is to provide a seed boot capable of providing an increased wear life over alloyed and unalloyed irons and steels or chrome plating by the use of an insert in accordance with the present invention.

Another aspect of the present invention is to provide a seed boot which will reduce the downtime necessitated by the replacement of worn seed boots, improve seed to soil contact, improve the efficiency of the planter and protect the seed within a v-shaped furrow.

SUMMARY OF THE INVENTION

Briefly, according to this invention, there is provided an insert secured to the lower edge of at least one, and preferably, two side members of a seed boot. The seed boot includes spaced side members, a face plate extending between forward edges of said side members, and a rear spacer member extending between rearward edges of said side members. The side members of the seed boot are of a quadrangular form having a linear top and bottom edge, a rearwardly facing edge extending upwardly and forwardly from rearward corner bottom edge of the side member and a leading edge extending upwardly and forwardly from a forward corner bottom edge of the side member, the leading edge having a greater angle of inclination than the angle of inclination of the rearward edge of each of the side members of the seed boot.

The side members of the seed boot are tapered downwardly and forwardly and the face plate of the seed boot is spaced from the bottom edge of the side members of the seed boot and extends upwardly and forwardly from the forward bottom corner of each side member between the forward leading edges of the side members of the seed boot.

The insert is an elongated rectangular bar shape having a top and bottom surface, a leading and trailing end and longitudinal side faces extending between and around the peripheral edges of the top and bottom surfaces. At least one of the corners formed by the intersection of the top surface and the longitudinal side faces of the insert are radiused or chamfered. In a preferred embodiment, at least two of the corners formed by the intersection of the top surface and the longitudinal side faces of the insert are radiused.

The insert may be made of tungsten carbide and barberite or, preferably, cemented tungsten carbide containing at least 9.5 weight percent cobalt.

BRIEF DESCRIPTION OF THE DRAWINGS

Further features and other aspects of the invention will become clear from the following detailed description made with reference to the drawings in which.

DESCRIPTION OF THE PREFERRED EMBODIMENTS

Figure 1:
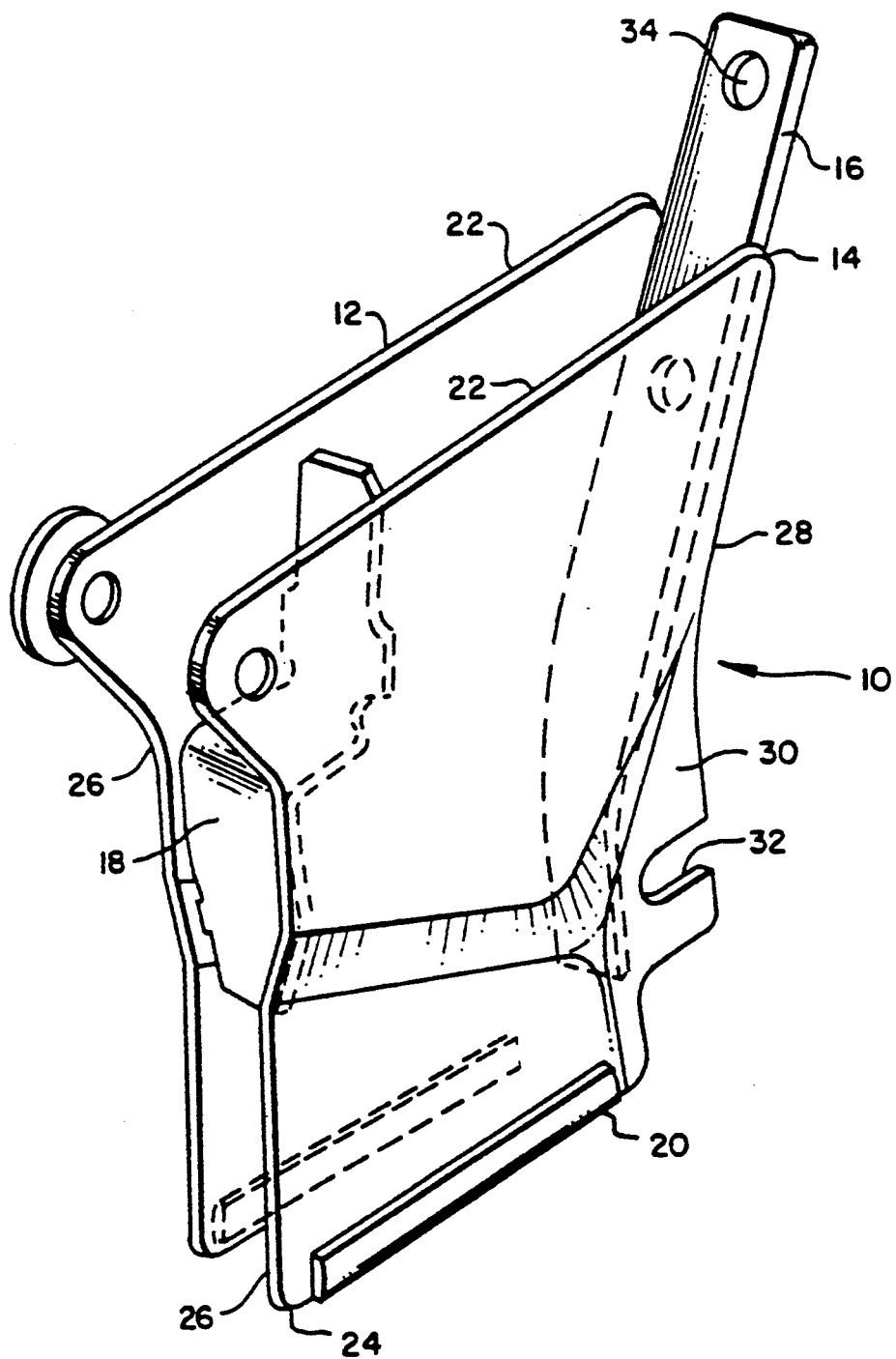
FIG. 1 is an isometric view of a seed boot in accordance with the present invention.

In the following description, like reference characters designate like or corresponding parts. Also, in the following description, it is to be understood that such terms as upwardly, forwardly, rearwardly, outwardly, inwardly, top, back, leading, trailing, lowermost, and the like, are words of convenience and are not to be construed as limiting terms.

Referring now to the figures, there is shown in FIGS. 1–4 a seed boot 10 in accordance with the present invention for use with a seed planter in which seeds are dropped through a seed tube (not shown) extending from the seed planter between the seed boot into a furrow. It will be appreciated that the seed boot 10 directs the seed to the bottom of a v-shaped furrow and prevents the movement of loose soil into the furrow until the seed has been deposited.

The seed boot 10 generally includes spaced side members 12 and 14, a face plate 16 extending between the forward edges of the side members and a rear spacer member 18 extending between rearward edges of the side members. Secured to each of the side members 12 and 14 of the seed boot 10 is an insert 20.

Figure 2:
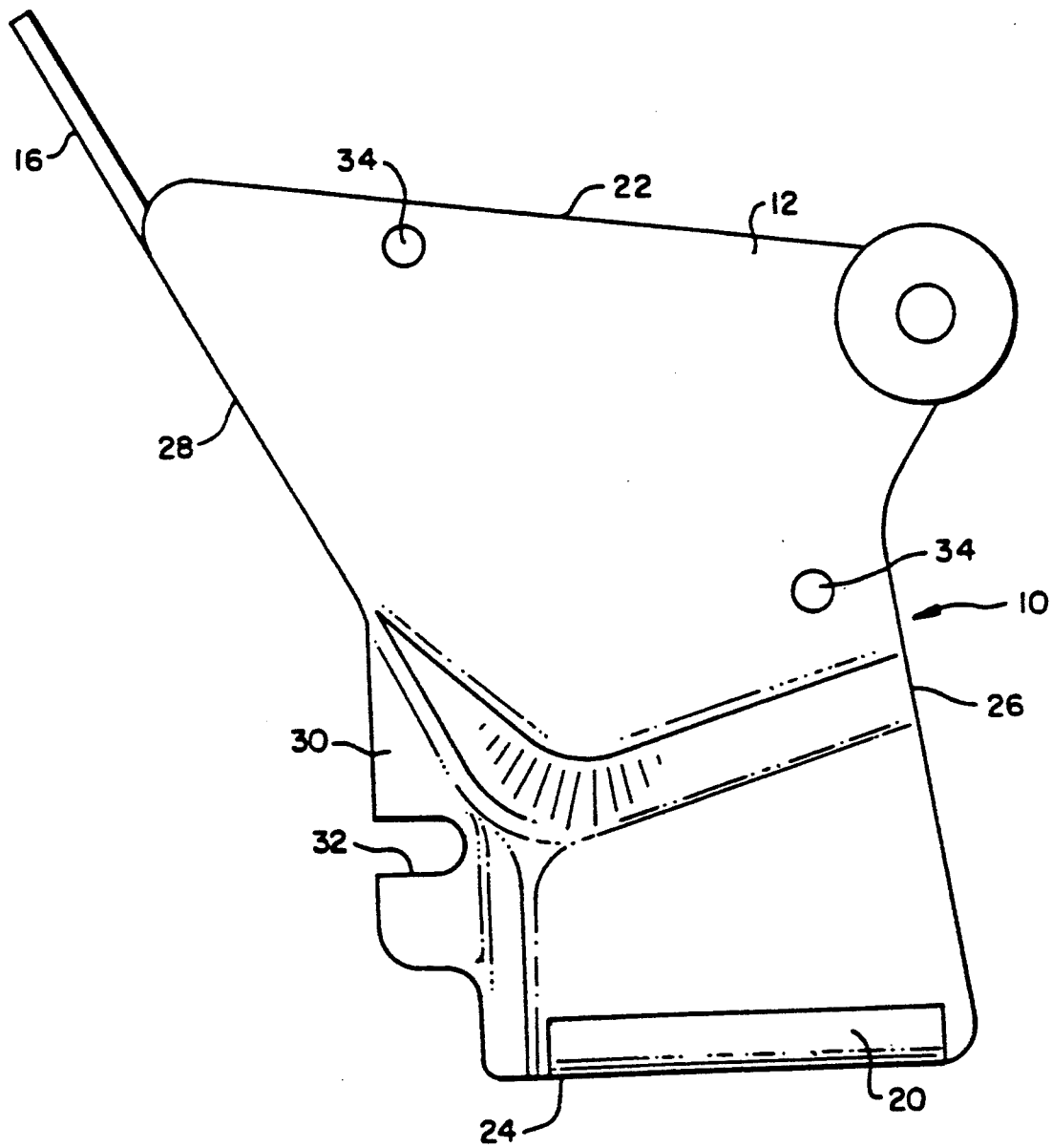
FIG. 2 is a side view of the seed boot of FIG. 1.
Figure 4:
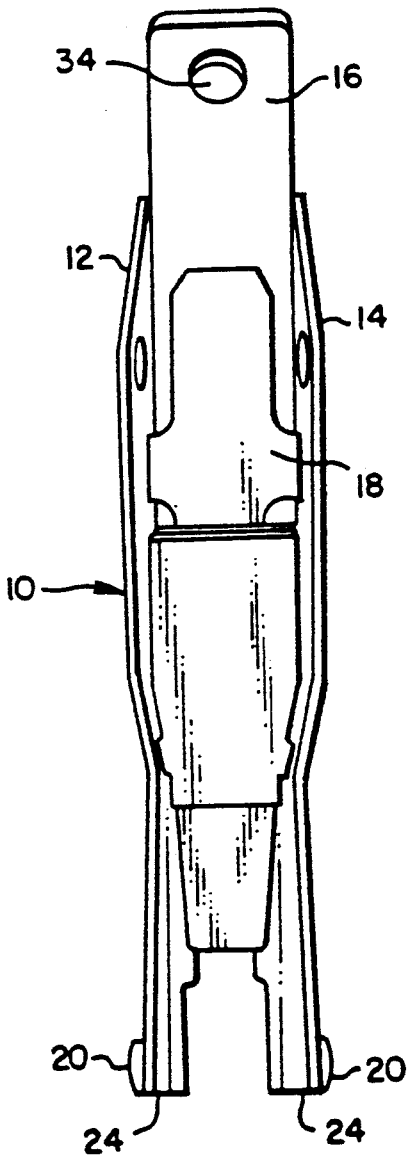
FIG. 4 is an end view of the seed boot of FIG. 1.
Figure 3:
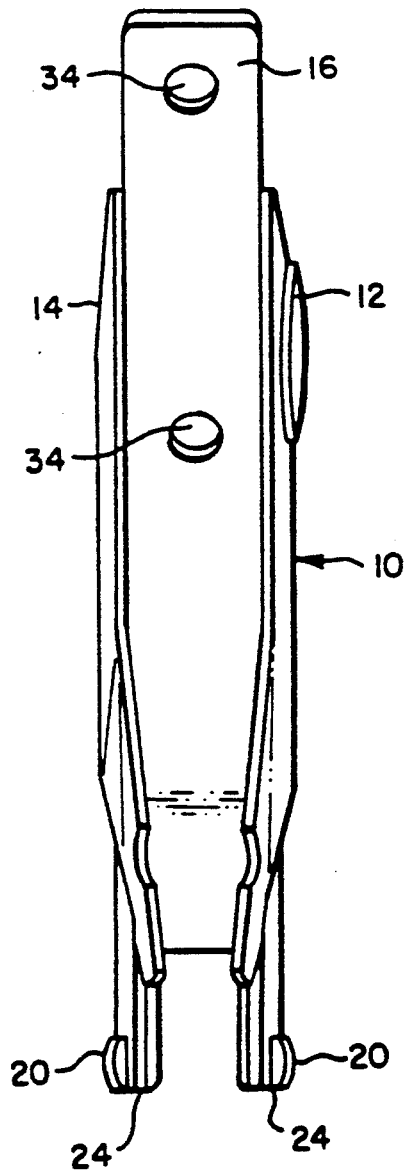
FIG. 3 is a front view of the seed boot of FIG. 1.
Figure 6:
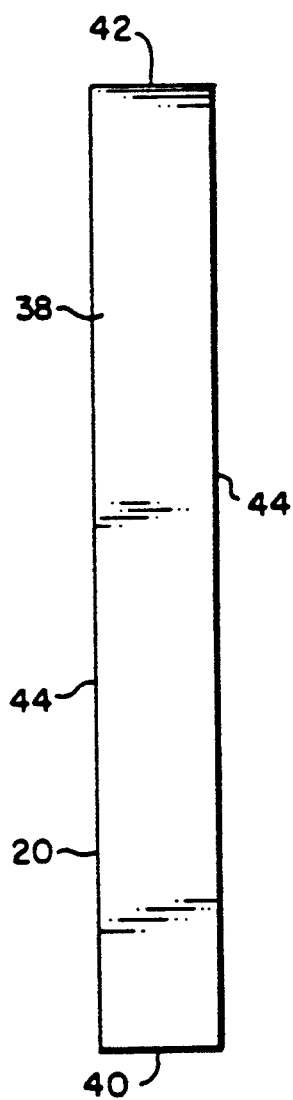
FIG. 6 is a bottom view of the insert of FIG. 5.
Figure 7:
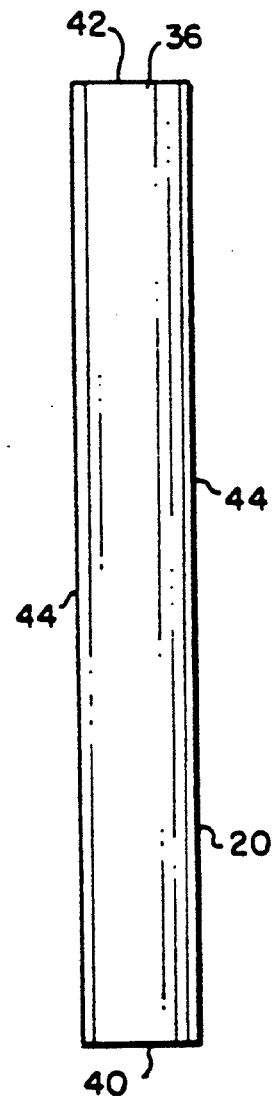
FIG. 7 is a top view of the insert of FIG. 5.
Figure 8:
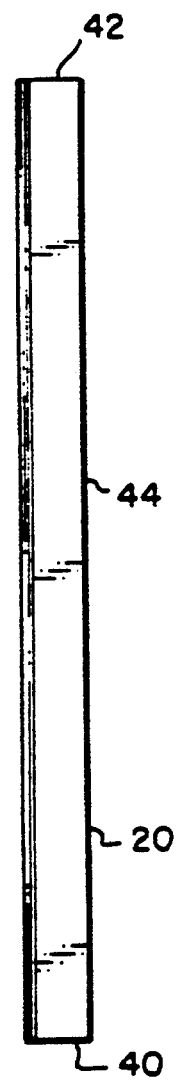
FIG. 8 is a side view of the insert of FIG. 5.

The side members 12 and 14 of the seed boot 10 are of a general quadrangular form having a linear top edge 22 and bottom edge 24. The rearwardly facing edge 26 of each side member 12 and 14 of the seed boot 10 extends upwardly and forwardly from the rearward corner bottom edge of the side member. Correspondingly, the leading edge 28 of each side member 12 and 14 of the seed boot 10 extends upwardly and forwardly from a forward corner bottom edge of the side member. The angle of inclination of the leading edge 28 is greater than the angle of inclination of the rearward edge 26 of each side member 12 and 14 of the seed boot 10. As shown in FIG. 2, the side members 12 and 14 may be tapered downwardly and forwardly to provide a streamlined seed boot 10 for improved soil flow around the seed boot as the seed boot travels within a furrow.

The face plate 16 of the seed boot 10 is spaced from the bottom edge 24 of the side members 12 and 14 of the seed boot and extends upwardly and forwardly from the forward bottom corner of each side member between the forward leading edges 28 of the side members of the seed boot. As shown in FIGS. 1-4, the face plate 16 tapers downward from the top edge 22 of the face plate 16 to follow the contour of the side members 12 and 14. Generally, triangular shaped portions 30 of the side members 12 and 14 of the seed boot 10 project forward beyond the face plate 16 and have formed therein slots 32 to receive a firming point (not shown) of a type disclosed in U.S. patent application Ser. No. 07/651,662 assigned to Kennametal Inc. Secured between the rearward edges 26 of the side members 12 and 14 of the seed boot 10 is an s-shaped spacer member 18.

Appropriate attachment apertures 34 are formed within the side members 12 and 14 and/or face plate 16 to secure the seed boot 10 to a suitable planting machine such as an International Model 800 Planter or International Model 900 Planter.

Figure 5:
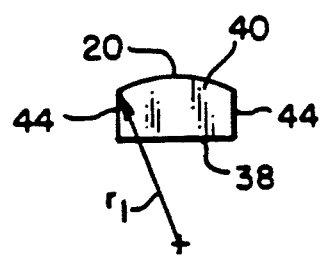
FIG. 5 is an end view of an insert design of a type illustrated on the seed boot of FIG. 1.

Attached to the lower bottom edge 24 of at least one, and preferably each side member 12 and 14 of the seed boot 10 is an insert 20 to prevent side and down force wear of the seed boot 10. As shown in FIGS. 5-8, the insert 20 is an elongated rectangular bar shape having a top and bottom surface 36 and 38, a leading and trailing end 40 and 42 and longitudinal side faces 44 extending between and around the peripheral edges of the top and bottom surfaces. The bottom surface 38 is a smooth surface to conform to the contour of the side members 12 and 14 of the seed boot 10. At least one, and preferably two corners 46 formed by the intersection of the top surface 36 and longitudinal side faces 44 of the insert are radiused $r_1$ to provide improved soil flow and prevent snagging of rocks, soil and mulch debris during the seed planting operation thereby enhancing uniform wear of the seed boot 10. As shown in FIG. 5, $r_1$ may range from 0.19 inches or more, for an insert approximately 3 inches long by 0.16 inches high by 0.37 inches wide.

It will be appreciated that in addition to preventing wear of the seed boot 10, placement of an insert 20 about the lower bottom edge 24 of each side member 12 and 14 of the seed boot also acts to retard penetration of the seed boot within the soil thereby deterring unnecessary soil and rock wear of the seed boot due to penetration of the seed boot below the soil within the v-shaped furrow.

The insert 20 may be comprised of a hard wear resistant material such as cemented tungsten carbide or a mixture of tungsten carbide in a barberite matrix. Barberite may be obtained from Dycon International, Incorporated of Troutdale, Oregon. ("Barberite" is a non-ferrous alloy containing approximately 88.5 wt% copper, 5 wt% nickel, 5 wt% tin and 1.5 wt% silicon.) In a preferred embodiment, the insert 20 is comprised of a cemented tungsten carbide containing cobalt as a binder, optionally with other refractory materials, such as cubic refractory transition metal carbides, as additives. In a preferred embodiment of the present invention the insert 20 includes at least 8 weight percent cobalt and no more than 20 weight percent cobalt.

The grain size of the tungsten carbide may vary from fine (e.g. about 1 micron), providing a harder insert, to coarse (e.g. about 12 micron), providing a tougher insert, depending on the intended use, the carbide to binder ratio, and the degree of fracture toughness desired.

The insert 20 may be brazed to each side member 12 and 14 by using conventional brazing compositions and techniques known to one skilled in the art. It will be appreciated the insert may also be welded or epoxied to each side member 12 and 14 using conventional techniques known to one skilled in the art.

The documents and patents referred to herein are hereby incorporated by reference.

Having described presently preferred embodiments of the invention, it is to be understood that it may be otherwise embodied within the scope of the appended claims.

What is claimed is:

1. A seed boot for depositing a seed within a furrow comprising:

spaced side members, said side members of the seed boot are of a quadrangular form having a linear top edge and linear bottom edge, an insert secured to said linear bottom edge of each of said side members of the seed boot, each of said side members of the seed boot includes a rearwardly facing edge extending upwardly and forwardly from rearward corner bottom edge of said side member and a leading edge extending upwardly and forwardly from a forward corner bottom edge of said side member, said leading edge having a greater angle of inclination than the angle of inclination of said rearward edge of each of said side members of said seed boot, said side members of the seed boot are tapered downwardly and forwardly and said face plate of the seed boot is spaced from the bottom edge of said side members of the seed boot and extends upwardly and forwardly from the forward bottom corner of each side member between the forward leading edges of said side members of the seed boot;

a face plate extending between forward edges of said side members;

a rear spacer member extending between rearward edges of said side members; and a wear insert secured to at least one of said side members of the seed boot, said insert is an elongated rectangular bar shape having a top and bottom surface, a leading and trailing face and longitudinal side faces extending between and around the peripheral edges of said top and bottom surfaces, at least two of the corners formed by the intersection of said top surface and said longitudinal side faces of said insert are radiused.

2. The seed boot of claim 1 wherein said spacer member is s-shaped.

* * * * *